United States Patent [19]
Horne

[11] Patent Number: 5,983,083
[45] Date of Patent: *Nov. 9, 1999

[54] HINGE STRUCTURE FOR FOLDABLE RADIOTELEPHONE

[75] Inventor: Tony James Horne, Hampshire, United Kingdom

[73] Assignee: Nokia Mobile Phones Limited, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,325

[22] Filed: Dec. 18, 1997

[30] Foreign Application Priority Data

Dec. 23, 1996 [GB] United Kingdom .................. 9626738

[51] Int. Cl.⁶ ........................................................ H04B 1/00
[52] U.S. Cl. ............................. 455/90; 455/550; 455/575
[58] Field of Search ............................. 455/90, 128, 347, 455/348, 349, 351, 550, 575; 379/428, 433; 16/336, 342

[56] References Cited

U.S. PATENT DOCUMENTS

| | | | |
|---|---|---|---|
| 5,111,503 | 5/1992 | Takagi | 16/342 |
| 5,185,790 | 2/1993 | Mischenko | 379/433 |
| 5,257,310 | 10/1993 | Takagi et al. | 379/433 |
| 5,629,979 | 5/1997 | Domoleczny | 379/433 |
| 5,661,797 | 8/1997 | Leman et al. | 379/433 |
| 5,715,575 | 2/1998 | Kubota | 16/342 |

FOREIGN PATENT DOCUMENTS

| | | |
|---|---|---|
| 0732474 A1 | 9/1996 | European Pat. Off. . |
| 0 777 369 | 6/1997 | European Pat. Off. . |
| 2260163 | 4/1993 | United Kingdom . |
| 2260571 | 4/1993 | United Kingdom . |
| 2 300 880 | 11/1996 | United Kingdom . |

*Primary Examiner*—Reinhard J. Eisenzopf
*Assistant Examiner*—Makoto Aoki
*Attorney, Agent, or Firm*—Perman & Green, LLP

[57] ABSTRACT

A radiotelephone comprising first and second housing portions connected by a hinge, the hinge comprising a mounting structure on the first housing portion; a shaft projecting into the mounting structure and rotatably connecting the mounting structure and the second housing portion and thereby defining an axis of rotation of the hinge, the shaft including a cam portion; spring means located in the mounting structure and including a pair of limbs elongate parallel to the axis of the shaft, the limbs converging to engage partway along their lengths the cam portion so as to apply a rotational bias to it, whereby the first and second housing portions can adopt an open bias position and a closed position; and a transducer located between the limbs in a region beyond the projecting end of the shaft.

13 Claims, 3 Drawing Sheets

HINGE STRUCTURE FOR FOLDABLE RADIOTELEPHONE

BACKGROUND OF THE INVENTION

The present invention relates to a radiotelephone and, more particularly, to the mechanical structure of a radiotelephone having first and second housing portions connected by a hinge. The hinge of this type of radiotelephone enables the housing portions to be folded between a compact closed position and an open position in which it is ready for use.

U.S. Pat. No. 5,257,310 discloses a prior art example of this type of radiotelephone.

SUMMARY OF THE INVENTION

In one aspect, the present invention may provide a radiotelephone comprising first and second housing portions connected by a hinge, wherein the hinge shaft is located between a pair of spring limbs elongate parallel to the axis of the shaft and converging to engage partway along their lengths a cam portion of the shaft so as to influence by cam action the operation of the hinge.

This structure of hinge enables relatively large spring limbs to be used as the limbs are elongate, and interact with the hinge shaft, along its largest dimension—its axis. Because of their size, the spring limbs can operate comfortably within their specification for the projected life of the hinge.

Preferably, the spring are constrained from movement at both ends thereof. Such constraint produces a high degree of resistance to the operation of the hinge (in comparison with an arrangement in which at least one end of the limbs is free to diverge and converge under the influence of the cam portion) which affords a favourable, positive sensation to the user.

For mechanical simplicity, the limbs conveniently may form part of a single spring member, preferably a U-shaped spring. In one embodiment, the hinge shaft projects from the open end of the spring partially along the length of the limbs. In this way, a region between the limbs and beyond the projecting end of the shaft is created. Within this region, a transducer or other component, preferably a microphone, can be advantageously located. Also, the spring may be affixed to the rest of the radiotelephone via its closed end.

In another aspect, the present invention may provide a radiotelephone comprising first and second housing portions connected by a hinge, the hinge comprising a mounting structure on the first housing portion, a shaft projecting into the mounting structure and rotatably connecting the mounting structure and the second housing portion and thereby defining an axis of rotation of the hinge, the shaft including a cam portion, spring means located in the mounting structure and including a pair of limbs elongate parallel to the axis of the shaft, the limbs converging to engage partway along their lengths the cam portion so as to apply a rotational bias to it, whereby the first and second housing portions can adopt an open bias position and a closed position, and a transducer located between the limbs in a region beyond the projecting end of the shaft.

This structure of hinge creates a region between the limbs and beyond the projecting end of the shaft in which a transducer can be located. The transducer can be a microphone in which case the microphone can be used with the first and second housing portions being either in the open bias position or the closed position.

In another aspect, the present invention may provide a radiotelephone comprising first and second housing portions connected by a hinge, the hinge comprising first connection means on the first housing portion, second connection means on the second housing portion, the connection means connecting with one another at mutually spaced connection zones such that the first and second housing portions can rotate about an axis of the hinge, the connection means including a shaft projecting from a said connection zone to a spring-contact zone which is intermediate of and remote from the connection zones, and a spring positioned to engage the shaft in the spring-contact zone and apply a rotational bias to it so as to influence the operation of the hinge.

BRIEF DESCRIPTION OF THE DRAWINGS

Exemplary embodiments of the invention are hereinafter described with reference to the accompanying drawings, in which.

DETAILED DESCRIPTION OF THE INVENTION

Figure 1:
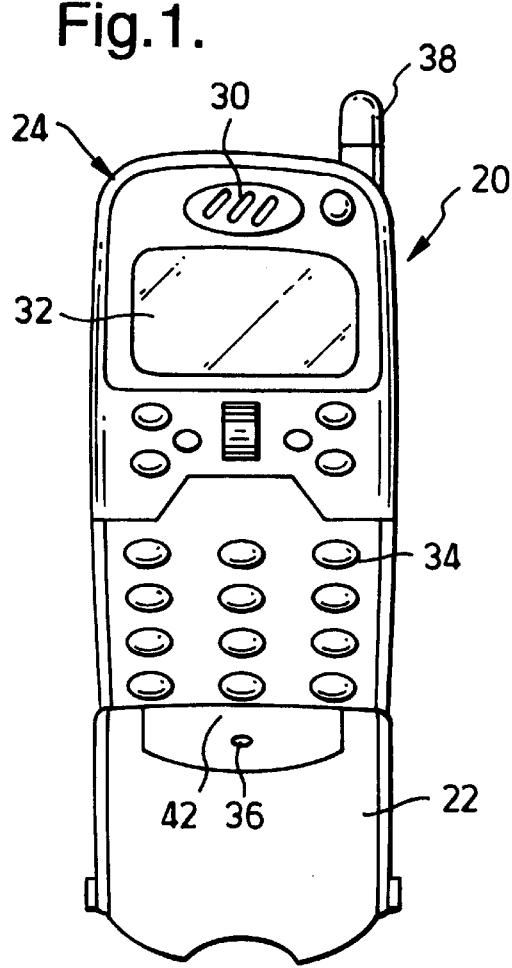
FIG. 1 shows a front view of a portable radiotelephone in accordance with an embodiment of the invention.
Figure 2:
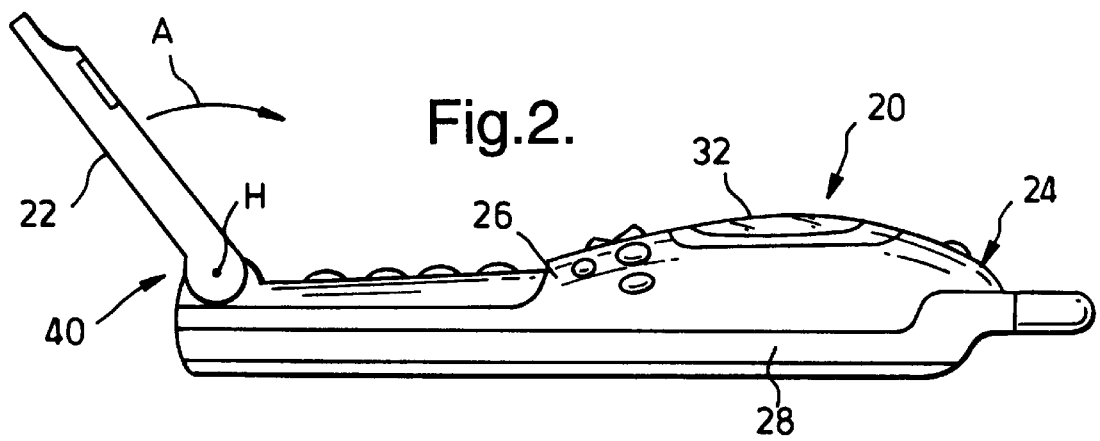
FIG. 2 shows a side view of FIG. 1.
Figure 3:
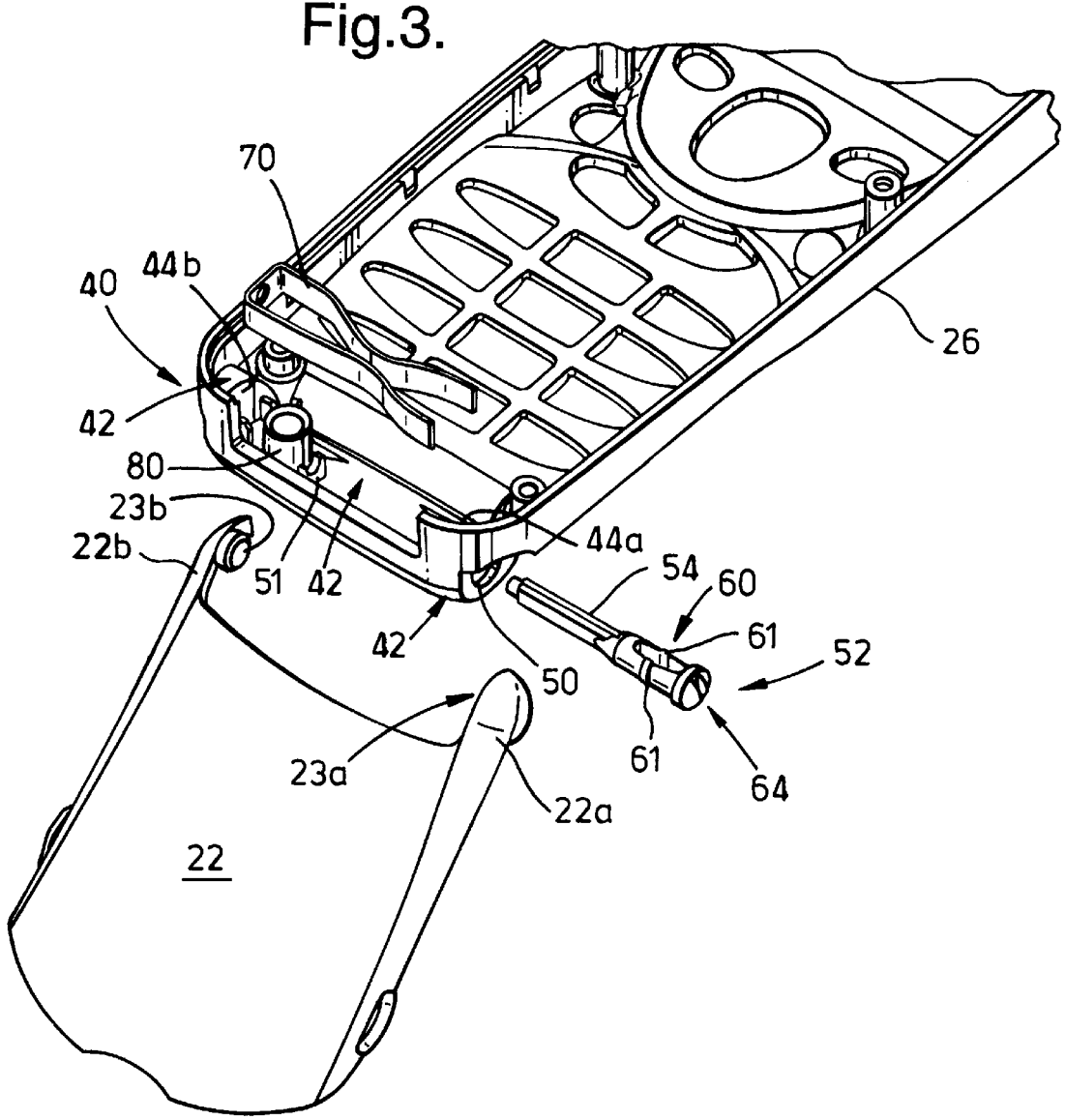
FIG. 3 shows an exploded perspective view of the front case and the cover of FIG. 1 when viewed from behind.
Figure 4:
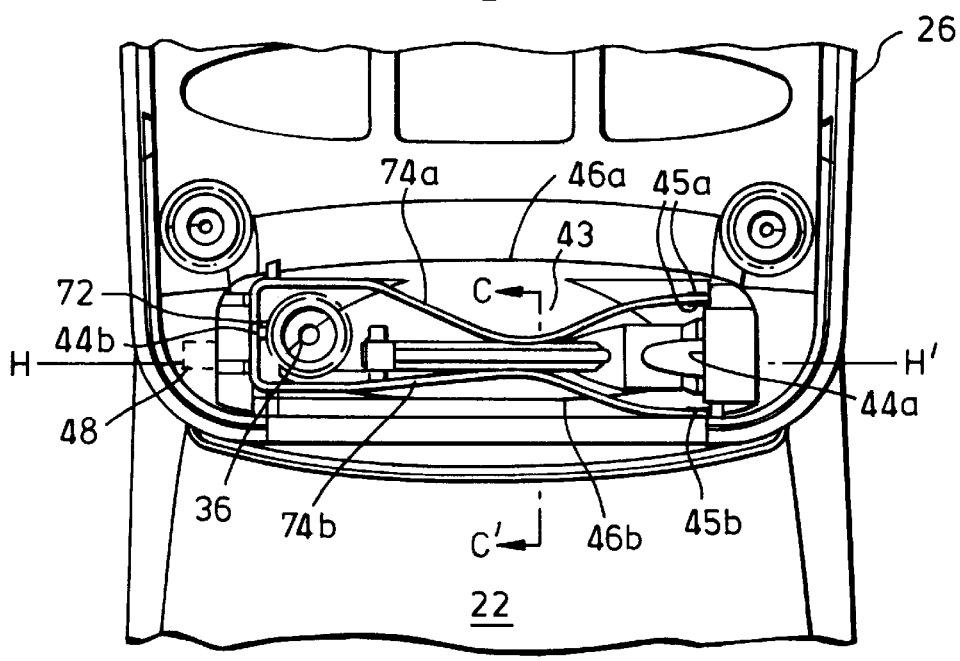
FIG. 4 shows a view of the front case and cover of FIG. 1 when viewed (in plan) from behind.

FIGS. 1 and 2 show a portable, cellular radiotelephone 20 comprising a main body 24 which is pivotally coupled to a cover 22 by a hinge 40 having an axis of rotation indicated by the line H-H' (See FIG. 4). The main body 24 includes a front case or A-cover 26 and a rear case or B-cover 28. A loudspeaker 30 is provided at an upper end portion of the main body 24. A display 32 and a keypad 34 are provided at a middle portion of the main body 24. A microphone (not visible in FIG. 2) is provided at a lower end portion of the main body 24 within 9 hinge mounting structure 42 (See FIG. 3). An aperture 36 is provided in the mounting structure 42 to provide an acoustic path to the microphone. The microphone and the loudspeaker 30 are positioned at opposite ends of the main body 24 to maximise the distance between them such that this distance, insofar as is possible given the dimensions of the main body 24, approximates the distance between the ear and mouth of a user. Reference numeral 38 refers to a slidable antenna provided at side of the main body 24.

In FIGS. 1 and 2, the radiotelephone 20 is shown in an open position in which the radiotelephone 20 is ready for use and the cover 22 is able to function as a voice reflection and collection member for the microphone. The cover 22 can be pivoted by means of the hinge 40 into a compact closed position, as indicated by arrow A, such that it lies on the main body 24 and overlies at least some of the keypad 34.

The mounting structure 42 protrudes from the front face of the front case 26 and defines an elongate cavity 43 having a longitudinal axis along the axis of rotation H-H' of the hinge 40. The cavity 43 is terminated lengthwise by end walls 44a, 44b and widthwise by side walls 46a, 46b. A spigot 48, invisible from the FIG. 3 or 4 view but shown in dotted outline in FIG. 4, projects from the outside of end wall 44b along the axis H-H'. An aperture 50 is provided in the end wall 44a, again, on the axis H-H'. The aperture 50 receives in a push-fit manner a shaft 52 (best seen itself in FIG. 3) as shown in FIG. 4. The shaft 52 is rotatable in the aperture 50 and its axis lies on the axis H-H'. The shaft 52 extends only partially along the length of the cavity and is supported at its projecting end by a cradle 51.

The shaft 52 includes a cam section 54, a locking section 60, including radially compressible wings 61 enabling the shaft to pushfit in the aperture 50, and a connection section 64.

The cover 22 is provided with a pair of projecting arms 22a, 22b each having a respective recess 23a, 23b—recess 23a not being visible. The recess 23b is shaped to mate with the spigot 48 to allow relative rotation between the recess 23b and the spigot 48, and the recess 23a is shaped to mate with the connection section 64 of the shaft 52 to prevent relative rotation between the recess 23a and the connection section 64 of the shaft 52. The cover 22 can thus be removably fastened to the main body 24 by the connection of the arms 22a, 22b with the connection section 64 and the spigot 48, thereby allowing the relative rotation of the main body 24 and the cover 22 about the axis H-H'.

A generally U-shaped leaf spring 70 is also provided within the mounting structure 42. The leaf spring 70 includes a short body segment 72. A long limb segment 74a, 74b upstands form each end of the body segment 72 such that the limb segments 74a, 74b lie in opposing relation to each other. The leaf spring 70 is secured to the end wall 44b via its body segment 72 using a screw. The body segment 72 extends widthwise across the cavity 43. The opposing limb segments 74a, 74b extend along the whole length of the cavity 43 and abut the other end wall 44a on opposite sides of the aperture 50 and hence also the shaft 52. A pair of formations 45a formed on the end wall 44a define a channel into which the limb segment 74a is snugly received. The formations 45a serve to constrain the end of the limb segment 74a. A formation 45b formed on the end wall 44a together with the side wall 46b define another channel into which the limb segment 74b is snugly received. The formation 45b and the side wall 46b thus together serve to constrain the end of the limb segment 74b. (It will be appreciated that the limb segments 74a, 74b may be thought of as being constrained at their other end as a result of upstanding from, and forming part of the same member as, the body segment 72.) The limb segments 74a, 74b converge in a central region of the cavity 43 partway along their length. Within this central region, the limb segments 74a, 74b converge sufficiently to pinch the cam section 54.

FIGS. 5(a–c) illustrate the interaction of the leaf spring 70 and the cam section 54 of the shaft 52 as the cover 22 is folded from its FIG. 2 open position to the closed position. As is apparent from FIGS. 5(a–c), the cam section 54 is octagonal in cross-section and comprises a pair of parallel major faces 56, a pair of parallel minor faces 57, the minor faces 57 being in planes perpendicular to the planes of the major faces 56. Each minor face 57 is connected to the major faces by a pair of shoulder faces 58.

Figure 5A:
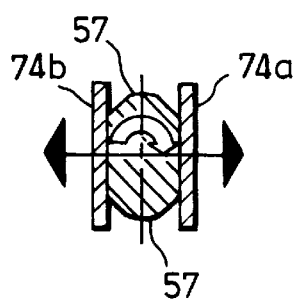
FIGS. 5(a–c) shows a cross-sectional view of the shaft and the leaf spring taken along the line C-C' in FIG. 4.

In FIG. 5(a), the shaft 52 is in the angular orientation associated with the cover 22 being in its FIG. 3 position. In this orientation, the limb segments 74a, 74b engage the major faces 56 of the cam section 54 and apply no net torque to the shaft 52. The limb segments 74a, 74b serves to hold the shaft 52 stably in this orientation because if the shaft 52 is rotated in either direction, as a result of movement of the cover 22 the limb segments 74a, 74b apply a opposing torque or bias to the shoulder face 58 of shaft 52 which acts to restore the shaft 52 to its FIG. 5(a) orientation.

Figure 5B:
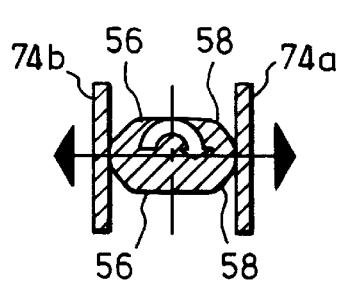

In FIG. 5(b), the shaft 52 is in the angular orientation associated with the cover 22 being partway between its open bias position of FIG. 2 and its closed position. In this orientation, the shaft 52 has been rotated in a clockwise direction from FIG. 5(a) causing the further separation of the limb segments 74a, 74b until the limb segments 74a, 74b engage the minor faces 57 of the shaft 52 and apply no net torque to the shaft 52. The limb segments 74a, 74b serve to hold the shaft 52 in this orientation but if the shaft 52 is rotated in either direction as a result of the movement of the cover 22 the limb segments 74a, 74b apply a torque to the shoulder faces 58 of the shaft 52 which acts to drive the shaft 52 into either its FIG. 5(a) or 5(c) orientation. It will be appreciated that in use the cover 22 will usually not be brought to rest such that the shaft 52 can rest in equilibrium in the FIG. 5(b) orientation but passes through this orientation as the cover 22 is moved from its open bias position of FIG. 2 to its closed position.

Figure 5C:
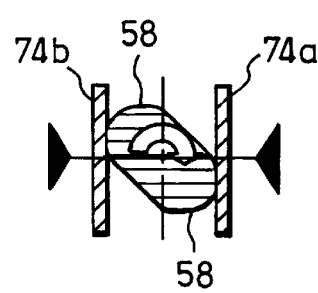

In FIG. 5(c), the shaft 52 is in the angular orientation associated with the cover 22 being in its closed position in which it overlies the main body 24. In this orientation, the limb segments 74a, 74b engage the a pair of shoulder faces 58 of the shaft 52 such that a net clockwise torque is applied to the shaft 52. This net torque is transmitted by the shaft 52 to the cover 22 and causes the cover 22 to be urged towards the main body 24 in its closed position. In other embodiments, the cover 22 need not be biased by the spring 70 into its closed position, but can be maintained in this position by a fastener or clip mechanism.

Referring back to FIG. 3, a holder 80 for receiving in a push-fit manner a microphone is formed in the mounting structure 42 between the projecting end of the shaft 52 and the end wall 44b of the cavity 43.

In the illustrated embodiment, the shaft 52 is held rotationally fast with the cover 22, and the spring 70 is held rotationally fast with the mounting structure 42 and hence the main body 24 for all possible relative angular positions of the main body 24 and the cover 22. In other embodiments, this need not be the case. For example, there can be free play between the cover 22 and the main body 24 for a limited number of relative angular positions of the main body 24 and the cover 22.

What is claimed is:

1. A radiotelephone comprising first and second housing portions connected by a hinge, wherein the hinge shaft is located between a pair of spring limbs which extend for the greater part of their length in a direction substantially parallel to the axis of the shaft and converging to engage partway along their lengths a cam portion of the shaft so as to influence by cam action the operation of the hinge, the spring limbs extending to tip ends, the first housing including formations for snugly receiving and constraining the tip ends.

2. A radiotelephone as in claim 1, wherein the first and second housing portions can adopt an open bias position and a closed position.

3. A radiotelephone as in claim 2, wherein in the closed position the first and second housing portions are biased together.

4. A radiotelephone as in claim 1, wherein the limbs are constrained at both ends.

5. A radiotelephone as in claim 1, wherein the limbs form part of a single member.

6. A radiotelephone as in claim 1, wherein the shaft projects from one end of the limbs partially along their length.

7. A radiotelephone as in claim 1, wherein the spring is generally U-shaped.

8. A radiotelephone as in claim 7, wherein the shaft projects from the open end of the spring.

9. A radiotelephone as in claim 6, further comprising a transducer located between the limbs in a region beyond the projecting end of the shaft.

10. A radiotelephone comprising first and second housing portions connected by a hinge, the hinge comprising:

a mounting structure on the first housing portion;

a shaft projecting into the mounting structure and rotatably connecting the mounting structure and the second housing portion and thereby defining an axis of rotation of the hinge, the shaft including a cam portion;

spring means located in the mounting structure and including a pair of limbs which extend for the greater part of their length in a direction substantially parallel to the axis of the shaft, the limbs converging to engage partway along their lengths the cam portion so as to apply a rotational bias to it, whereby the first and second housing portions can adopt an open bias position and a closed position, the spring limbs extending to tip ends, the first housing including formations for snugly receiving and constraining the tip ends; and a transducer located between the limbs in a region beyond the projecting end of the shaft.

11. A radiotelephone as in claim 10, wherein the transducer comprises a microphone.

12. A radiotelephone as in claim 11, further comprising an aperture in the mounting structure which provides an acoustic path to the microphone.

13. A radiotelephone comprising first and second housing portions connected by a hinge, the hinge comprising:

first connection means on the first housing portion;

second connection means on the second housing portion;

the connection means connecting with one another at mutually spaced connection zones such that the first and second housing portions can rotate about an axis of the hinge, the connection means including a shaft projecting from a said connection zone to a spring-contact zone which is intermediate of and remote from the connection zones, and a spring positioned to engage the shaft in the spring-contact zone and apply a rotational bias to it so as to influence the operation of the hinge, the spring including a pair of limbs which extend for the greater part of their length in a direction substantially parallel to the axis of the shaft, the limbs converging to engage partway along their length a cam portion of the shaft, the spring limbs extending to tip ends, the first housing including formations for snugly receiving and constraining the tip ends.

\* \* \* \* \*